United States Patent [19]

Bosy

[11] Patent Number: 5,383,001
[45] Date of Patent: Jan. 17, 1995

[54] VACUUM DRUM FOR MOUNTING MEDIA OF DIFFERENT SIZES

[75] Inventor: Brian Bosy, Framingham, Mass.

[73] Assignee: Intergraph Corporation, Huntsville, Ala.

[21] Appl. No.: 23,780

[22] Filed: Feb. 22, 1993

[51] Int. Cl.$^6$ .............................................. G03B 27/60
[52] U.S. Cl. ........................................ 355/73; 101/378; 101/415.1; 226/93; 271/276; 355/47
[58] Field of Search ................. 271/276; 226/93; 355/73, 47; 101/378, 415.1

[56] References Cited

U.S. PATENT DOCUMENTS

| | | | |
|---|---|---|---|
| 4,005,653 | 2/1977 | Arkell | 101/382 MV |
| 4,056,057 | 11/1977 | Smith | 101/382 MV |
| 5,183,252 | 2/1993 | Wolber et al. | 271/276 |

*Primary Examiner*—Richard A. Wintercorn
*Attorney, Agent, or Firm*—Bromberg & Sunstein

[57] ABSTRACT

A rotatable drum for use in a plotter, or similar device, that provides vacuum for holding the film or other media to the drum's surface, so as to easily accommodate films of various sizes. The drum includes first and second journals and a plate mounted on the circumference of the first and second journals. At least one of the journals has defined on its circumference circumferential channels. The plate has interior and exterior sides, and the first and second journals and a portion of the plate's interior side define a chamber. The plate's exterior side has defined thereon a plurality of grooves. In one embodiment, at least one of the grooves, associated with a first film size, is in fluid communication with the chamber, and some of the remaining grooves, associated with the larger film sizes, are in fluid communication with the channels. A vacuum is supplied to the chamber, and a valve is provided for controlling fluid communication between the channels and the chamber.

7 Claims, 3 Drawing Sheets

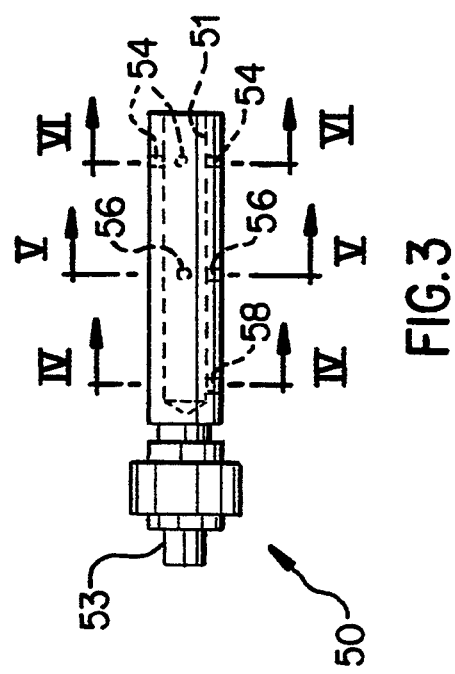

VACUUM DRUM FOR MOUNTING MEDIA OF DIFFERENT SIZES

DESCRIPTION

1. Technical Field

This invention generally relates to plotters, scanners and similar devices that use a rotatable drum for mounting the films or documents that are to be exposed or scanned, and particularly such devices which use vacuum drums.

2. Background Art

Previous vacuum drums typically had only a single chamber with holes connecting the inner chamber to the surface of the drum. In order to mount smaller films on such a drum, the operator had to mask the unused portion of the drum surface.

U.S. Pat. No. 3,617,127 to McDuff shows a flat-bed photographic enlarger that uses a group of nested vacuum channels to hold the film to the flat bed.

SUMMARY OF THE INVENTION

The purpose of the invention is to provide a vacuum drum for holding the film or other media to the drum's surface and to easily accommodate films of various sizes.

The invention includes first and second journals and a plate mounted on the circumference of the first and second journals. The first journal—and, in an alternative embodiment, the second journal as well—has defined on its circumference a circumferential channel. The plate has interior and exterior sides, and the first and second journals and a portion of the plate's interior side define a chamber. The plate's exterior side has defined thereon a plurality of grooves. In one embodiment, at least one of the grooves, associated with a first film size, is in fluid communication with the chamber, and at least one of the remaining grooves, associated with a second film size, is in fluid communication with the channel. Additional channels and grooves may be provided for additional film sizes.

A vacuum is supplied to the chamber, and a valve is provided for controlling fluid communication between the channel and the chamber. The valve may be located in the first journal adjacent an opening in the journal connecting the valve to the channel. The valve comprises a hollow cylindrical portion, one end of which is in fluid communication with the chamber. The cylindrical portion has at least one aperture defined therein and may be rotated within the first journal, so that, in one position, the valve's aperture and the journal's opening do not line up and fluid communication is not provided between the chamber and the channel, and in a second position, the valve's aperture and the journal's opening do line up and fluid communication is provided between the chamber and the channel.

In an alternative embodiment, the first journal has defined on its circumference two circumferential channels. The plate is mounted on the circumference of the first and second journals, so that portions of the plate's interior side overlie the first and second channels. The plate's exterior side has defined thereon a plurality of grooves. At least one of the grooves, associated with the first film size, is in fluid communication with the first channel, and at least one of the remaining grooves, associated with the second film size, is in fluid communication with the second channel. Additional channels and grooves may be provided for additional film sizes.

In this embodiment, a conduit supplies a vacuum to the first and second channels, and a valve, disposed in the conduit, controls fluid communication to the first and second channels. The valve is located in the first journal adjacent first and second openings respectively connecting the valve to the first and second channels. The valve's cylindrical portion has at least two apertures defined therein and may be rotated within the first journal, so that, in one position, one of the valve's apertures and the journal's first opening line up and fluid communication is provided between the conduit and the first channel, and in a second position, the other of the valve's apertures and the journal's second opening line up and fluid communication is provided between the conduit and the second channel. The grooves for the smallest film size may be in fluid communication with the chamber or with one of the channels. Alternatively, the valve may be used to shut off the vacuum to only the second channel, so that the first channel and its associated grooves may always be in fluid communication with the vacuum source.

BRIEF DESCRIPTION OF THE DRAWINGS

FIG. 3 shows a valve plug used in the drum.

FIGS. 4–6 show cross-sections of the valve plug shown in FIG. 3.

DESCRIPTION OF SPECIFIC EMBODIMENTS

Figure 1:
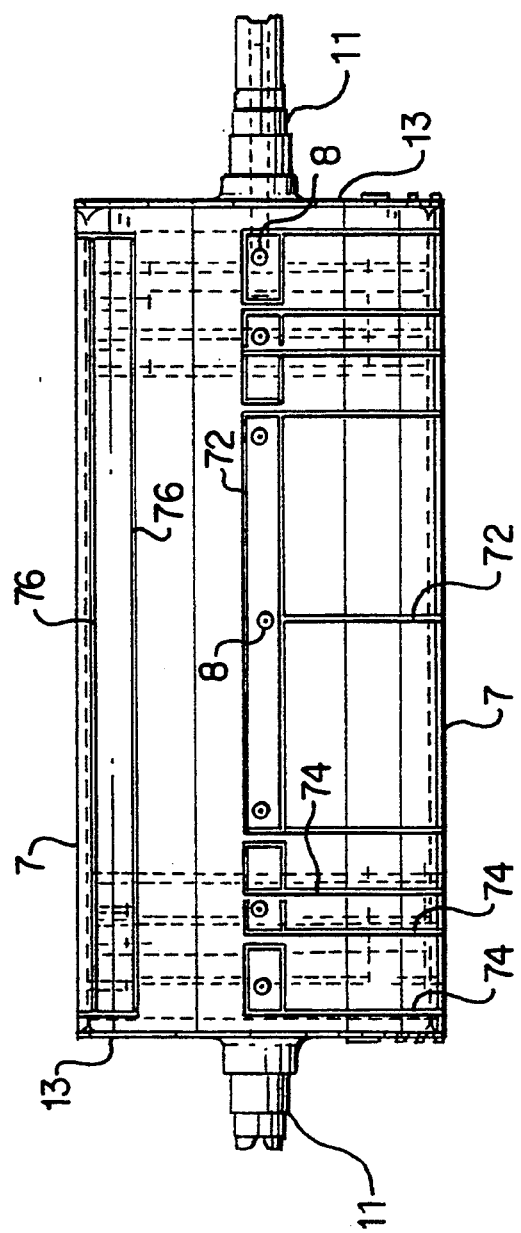
FIG. 1 shows a vacuum drum according to the present invention.

FIG. 1 shows a rotatable plotting drum according to the present invention. Film is mounted onto the exterior of the circumferential plate 7 of the drum. The drum has two shafts 11 extending from its end disks 13. Through one of the shafts 11 a vacuum supply is attached to the drum. On the exterior of the circumferential plate 7 are registration pins 8, and a variety of vacuum grooves 72, 74 and 76. When a vacuum is provided to them, the vacuum grooves 72, 74 and 76, hold the film to the surface of the drum. The registration pins 8 prevent the film from sliding across the surface.

Figure 2:
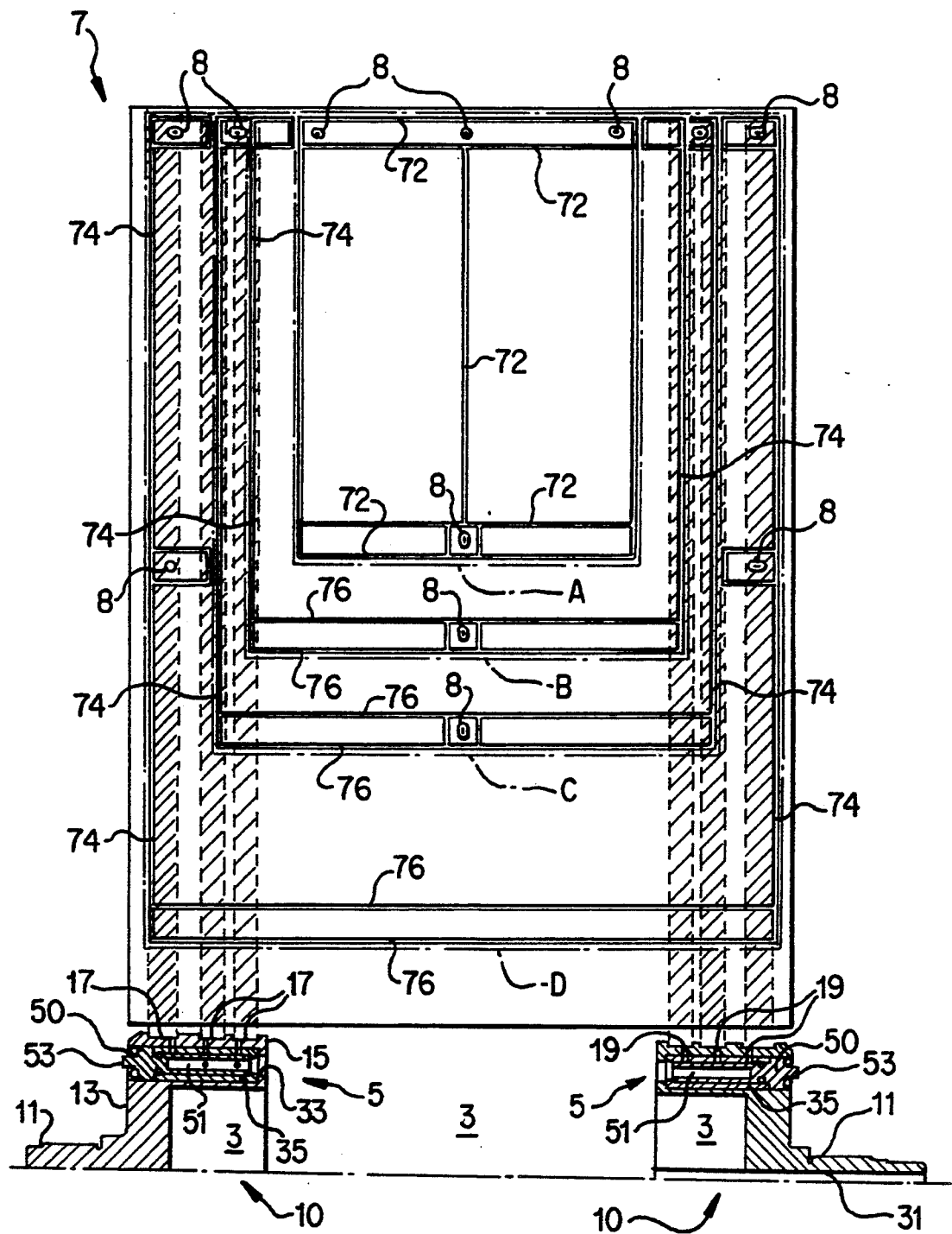
FIG. 2 shows the components of the drum and their arrangement with respect to each other.

FIG. 2 shows the left and right journals 10 and the circumferential plate 7 (shown flattened out) that is placed around the journals 10 to form the drum. A vacuum supply bore 31 in one of the shafts 11 of the journals 10 provides a vacuum to the interior chamber 3 of the drum. The inner chamber 3 is defined by the middle portion of plate 7 and the journals 10. Thus, when the drum is evacuated, the interior of the circumferential plate's middle portion is exposed to a vacuum.

The plate 7 is preferably a tube, which is warmed so that it expands to a size large enough so that the inner diameter of the tube can pass over the outer diameter of the journals 10, which are kept at room temperature. After being slipped over the journals 10, the tube is allowed to cool and contract, so that the tube is shrink-fitted tightly onto the journals. Other means, such as welding or press fitting, can be used to attach the plate 7 to the journals 10. A flat plate that is bent to assume a cylindrical shape may be used instead of a tube, but is less preferred because of the additional assembly steps required and the stresses in the plate that would result from the bending. Preferably, the journals 10 and the plate 7 are made of metal, such as aluminum or steel.

On the plate 7 is shown broken lines outlining where the four differently sized films, A, B, C and D, are mounted on the circumferential plate. The film sizes, A, B, C and D, may be, for example, 11 inches by 14 inches, 14 inches by 17 inches, 16 inches by 20 inches, and 20 inches by 26 inches, respectively. Just inside each of these broken-line outlines are sets of grooves 72, 74 and 76 in the exterior surface of the plate 7. The inner set of grooves 72, which are associated with film size A, are on middle portion of the plate 7. These inner grooves 72 have holes passing all the way through the plate 7, so as to provide fluid communication with the inner chamber 3. Thus, the vacuum in the inner chamber 3 is provided to the inner set of grooves 72.

The journals 10 include the drum's end disks 13, the shafts 11 used for mounting and turning the drum, and a cylindrical portion 15 on which the circumferential plate 7 is mounted. The mounting portions 15 of the two journals have three pairs of channels 17. The hatched portions shown on the plate 7 in FIG. 2 show what portions of the plate 7 overlie the journal channels 17, when the plate 7 is mounted on the mounting portions 15 of the journals 10. Each pair of journal channels 17 is associated with a set of plate grooves 74 and 76, for film sizes B, C and D.

Vacuum may be provided from the chamber 3 to the journal channels 17 by turning the valves 5. Each of the channels 17 is connected to the valves 5 by a channel opening 19. FIG. 3 depicts a valve plug 50, which is placed in a sleeve 35 in a valve mount 33 in the cylindrical portion 15 of each of the journals 10. The valve plug 50 has a knob 53 for turning the valve plug. FIGS. 4–6 show three cross-sections of the valve plug 50. Visible in these cross-sections is the valve's bore 51, which is open to the drum's inner chamber 3 when the valve plug 50 is mounted in the valve seat 33. The FIG. 4 cross section shows a single aperture 58 in the wall of the valve plug 50.

When the valve plug 50 is turned so that this aperture 58 is lined up with its corresponding channel opening 19 for the outermost journal channel 17, the other two valve apertures 58 that are on the same side of the valve plug 50 are also lined up with their respective channel openings 19, so that vacuum is provided to all three channels 17 on that journal 10 that the valve 5 is in.

Whereas FIG. 4 shows only one aperture 58, FIG. 5 shows two apertures 56 and 58 spaced 90° away from each other, and FIG. 6 shows three apertures 54, 56 and 58 spaced 90° apart. Starting from the position that provides vacuum to all three journal channels 17, when the valve plug 50 is turned 90° in one direction, the vacuum is shut off from the outermost channel and provided only to the two inner channels. Turning the valve plug 50 another 90° shuts the vacuum off from the two outermost channels and provides vacuum only to the innermost channel. Turning the valve plug 50 yet another 90°, shuts the vacuum off from all three journal channels 17. If the valve plug 50 is turned another 90° in the same direction, the valve returns to its original position, where vacuum is provided to all three journal channels 17.

No matter which of these four positions the valve 5 is in, vacuum is provided to the interior surface of the middle portion of plate 7 and thence through holes in the inner set of plate grooves 72. Circumferential plate grooves 74 for the three larger sizes of film—B, C and D—overlay one of the journal channels 17. These circumferential plate grooves 74, like the grooves 72 for the smallest film size, A, have holes all the way through the plate 17 to provide vacuum to the grooves 74. Thus, when vacuum is provided to a journal channel 17, it is also provided to the circumferential groove 74 lying above that channel.

The axial plate grooves 76 for the three larger film sizes do not have holes passing through the plate 7, but they are connected to circumferential grooves 74, so that when a vacuum is provided to a circumferential groove 74 it is also provided to the axial grooves 76 attached to it. By not providing the axial grooves 76 with holes, vacuum is not provided to the grooves for the larger film sizes from the inner chamber 3 or the journal channels for the smaller film sizes, when the valves 5 are set for a smaller film size.

In one valve position, no vacuum is provided to any of the journal channels 17, so vacuum is provided only to the plate grooves 72 for the smallest film size, A. Turning the valves 90° provides vacuum to these grooves as well as to the grooves for the second smallest film size, B. Turning the valves another 90° provides vacuum to the grooves for film size C, as well as for the grooves for film sizes A and B. Finally turning the valves another 90° provides vacuum to all the plate grooves 72, 74 and 76. Thus, when the valve is set for a particular film size, a vacuum is provided to the grooves associated with that film size and any smaller sizes. Vacuum is provided to the A-film-size grooves 72 for all film sizes, because the A-film-size grooves are directly connected to the inner chamber. When the valves are set for the D film size, vacuum is provided to all the grooves.

It is preferred that for a given film size vacuum is provided to all the grooves for smaller film sizes (if any), since this provides more vacuum for larger films. It will be appreciated that the valves may be adapted so that vacuum is not provided for some or all of the smaller film sizes when the valve is set for larger film sizes.

Of course, instead of the film sizes mentioned above, different film sizes may be accommodated by altering the dimensions of the grooves. Furthermore, any number of film sizes may be provided for in a single drum. If the drum is meant to accommodate more than four film sizes, then additional journal channels 17 will necessary, as well as additional circumferential and axial vacuum grooves 76 and 74, and the valve plugs 50 must also be adapted to provide vacuum to the additional journal channels. For instance, if the drum is meant to accommodate five different film sizes, then four journal channels 17 should be provided on each journal 10, openings/apertures 19, 54, 56 and 58 must be provided for each journal channel 17, and the apertures in the valve plug 50 should be spaced about 72° apart.

It has been found that, instead of using two valves 5, one in each journal 10, only a single valve may be used, because the axial grooves 76 can carry the vacuum with enough strength to the circumferential grooves 74 over the journal that does not have a valve. Such a system has the advantages of avoiding the cost of the second valve and avoiding the necessity of having to turn both valves every time a film of a different size is to be placed on the drum.

The volume of the inner chamber 3 may be reduced, so that less time is needed to draw a vacuum of the desired strength. In one embodiment, the vacuum grooves 72 for the smallest film size may be in fluid communication with a separate journal channel 17, instead of the chamber 3. In this embodiment, the vacuum must be provided to the grooves for the smallest film size through a valve 5. The volume of the inner chamber 3, in this embodiment, can be reduced so that the chamber is nothing more than a passage from the vacuum-supply bore 31 to the valve or valves 5.

Instead of using the same valve 5 for all the journal channels 17, a separate valve may be used for each journal channel, although this embodiment is less preferred since it has more parts and requires the operator to adjust three or six different valves instead of just one or two.

The drum can have two—or more—sets of nested grooves, each set being circumferentially displaced from the other. In an embodiment having two such sets of nested grooves, the pattern shown on the circumferential plate 7 in FIG. 2, or a similar pattern, would be repeated for each of the two sets of nested grooves on each 180° sector of the drum surface. If three or more such sets are circumferentially displaced from each other on the drum surface, the FIG. 2 pattern, or similar pattern, would repeated on smaller sectors of the drum—each sector being about 360°/n, where n is the number of nested-groove sets. Each nested-groove set can be provided with a separate valve or pair of valves 5 and the inner chamber 3 of the drum divided into sub-chambers by walls, so that less than all of the sets may be used. The journal channels 17 would only extend 360°/n around the circumference of the drum. Instead of using sub-chambers, the vacuum grooves for the smallest film size in each set may be in fluid communication with a journal channel 17 instead of the inner chamber 3.

Two nested-groove sets can also be placed axially next to each other. In such an embodiment, a valve 5 is necessary for each of the two journals 10. A wall may also be used to divide the inner chamber 3 into two portions, along with a valve to provide or shut off the vacuum to the sub-chamber further from the vacuum-supply bore 31. Alternatively, a separate vacuum-supply bore 31 may be placed in each shaft 11, so that each sub-chamber has its own vacuum supply. By dividing the chamber 3 into two sub-chambers in this way, one can prevent the vacuum from being provided to one of the two axially displaced sets, and thereby use only one of them. As with the circumferentially displaced nested-groove sets, the vacuum grooves for the smallest film size in each set may be in fluid communication with a journal channel 17 instead of the inner chamber 3, so that sub-chambers do not have to be used. Furthermore, the foregoing techniques of providing axially and circumferentially displaced nested-groove sets on the same drum may be used concurrently to arrange four such sets two by two: two axially displaced pairs of circumferentially displaced sets.

The drum described hereinabove is meant to be used in a plotter that exposes a film mounted on the drum, typically by means of a laser. An alternative embodiment can have printing plates mounted thereon that may be etched with a laser beam. Such an embodiment should use, in lieu of or in addition to the registration pins 8, clamping mechanisms to ensure that the plate is safely secured to the drum. A drum similar to that shown in the figures may also be used in a scanner, wherein documents, having for the most part certain standard sizes, would be mounted on the drum to be scanned.

Although the invention has been described with reference to several preferred embodiments, it will be understood by one of ordinary skill in the art that various modifications can be made without departing from the spirit and the scope of the invention, as set forth in the claims hereinbelow.

What is claimed is:

1. A rotatable drum for mounting media having first and second standard sizes, the drum comprising:

first and second journals having a circumference, the first journal having defined on its circumference a covered circumferential channel;

a plate mounted on the circumference of the first and second journals, the plate having interior and exterior sides, such that the journals touch the interior side and such that the covered circumferential channel is covered by the plate, the first and second journals and a portion of the plate's interior side defining a chamber, the plate's exterior side having defined thereon first and second sets of exposed grooves, wherein the first set of exposed grooves has means for providing fluid communication with the chamber, and wherein the second set of exposed grooves has one circumferential groove disposed over the covered channel and one axial groove passing over the chamber, the axial and circumferential grooves being in fluid communication with each other, wherein the circumferential groove has means for providing fluid communication with the covered channel and the axial groove has means for preventing fluid communication with the chamber;

means for supplying a vacuum to the chamber; and a valve for controlling fluid communication between the covered channel and the chamber.

2. A drum according to claim 1, wherein the valve is located in the first journal adjacent an opening in the journal connecting the valve to the channel and comprises a hollow cylindrical portion, one end of which is in fluid communication with the chamber, the cylindrical portion having at least one aperture defined therein, the cylindrical portion being rotatable within the first journal, so that, in one position, fluid communication is not provided between the chamber and the channel, and in a second position, fluid communication is provided between the chamber and the channel.

3. A drum according to claim 1 for mounting media having first, second and third standard sizes, wherein the first journal has defined on its circumference a second covered circumferential channel; wherein the plate's exterior side has defined thereon a third set of exposed grooves, wherein the third set of exposed grooves has one circumferential groove disposed over the second covered channel and one axial groove passing over the first covered channel and the chamber, the axial and circumferential grooves being in fluid communication with each other, wherein the circumferential groove has means for providing fluid communication with the second covered channel and the axial groove has means for preventing fluid communication with the first covered channel and chamber; and wherein the valve further controls fluid communication between the second covered channel and the chamber.

4. A drum according to claim 3, wherein the valve is located in the first journal adjacent first and second openings in the journal respectively connecting the valve to the first and second channels and comprises a hollow cylindrical portion, one end of which is in fluid communication with the chamber, the cylindrical portion having at least two apertures defined therein, the cylindrical portion being rotatable within the first journal, so that, in one position, fluid communication is not provided between the chamber and either channel, and in a second position, fluid communication is provided between the chamber and the first channel, and in a third position, fluid communication is provided between the chamber and the second channel.

5. A rotatable drum for mounting media having first and second standard sizes, the drum comprising:
first and second journals having a circumference, the first journal having defined on its circumference first and second covered circumferential channels;
a plate mounted on the circumference of the first and second journals, the plate having interior and exterior sides, such that the journals touch the interior side and such that the covered circumferential channels are covered by the plate, the plate's exterior side having defined thereon first and second sets of exposed grooves,
wherein the first set of exposed grooves has means for providing fluid communication with the first covered channel, and
wherein the second set of exposed grooves has one circumferential groove disposed over the second covered channel and one axial groove passing over the first covered channel, the axial and circumferential grooves being in fluid communication with each other,
wherein the circumferential groove has means for providing fluid communication with the second covered channel and
the axial groove has means for preventing fluid communication with the first covered channel;
a conduit for supplying a vacuum to the first and second covered channels; and
valve means, disposed in the conduit, for controlling fluid communication to the second covered channel.

6. A drum according to claim 5, wherein the valve is located in the first journal adjacent first and second openings in the journal respectively connecting the valve to the first and second channels and comprises a hollow cylindrical portion, one end of which is in fluid communication with the conduit, the cylindrical portion having an aperture defined therein, the cylindrical portion being rotatable within the first journal, so that, in one position, fluid communication is provided between the conduit and the first channel but not to the second channel, and in a second position, fluid communication is provided between the conduit and the second channel.

7. A drum according to claim 5 for mounting media having first, second and third standard sizes, wherein the first journal has defined on its circumference a third covered circumferential channel; wherein the plate's exterior side has defined thereon a third set of exposed grooves,
wherein the third set of exposed grooves has one circumferential groove disposed over the third covered channel and one axial groove passing over the first and second covered channels, the axial and circumferential grooves being in fluid communication with each other,
wherein the circumferential groove has means for providing fluid communication with the third covered channel and
the axial groove has means for preventing fluid communication with the first and second covered channels; and
wherein the valve further controls fluid communication to the third covered channel.

* * * * *